United States Patent [19]

Konishi et al.

[11] Patent Number: 4,945,430
[45] Date of Patent: Jul. 31, 1990

[54] CARRIER APPARATUS FOR TAKING INFORMATION-STORAGE REGULAR ARTICLES IN AND OUT

[75] Inventors: Masao Konishi; Shigeki Tsuchida, both of Osaka, Japan

[73] Assignee: Kabushiki Kaisha Itoki Kosakusho, Osaka, Japan

[21] Appl. No.: 339,897

[22] Filed: Apr. 18, 1989

Related U.S. Application Data

[63] Continuation of Ser. No. 159,591, filed as PCT JP87/00368 on Jun. 9, 1987, published as WO87/07751 on Dec. 17, 1987, abandoned.

[30] Foreign Application Priority Data

Jun. 16, 1986 [JP] Japan .............................. 61-92246[U]
Jun. 16, 1986 [JP] Japan .............................. 61-92247[U]

[51] Int. Cl.⁵ ..................... G11B 15/68; G11B 23/12
[52] U.S. Cl. ................... 360/92; 360/98.05; 360/98.06; 360/99.07; 369/36
[58] Field of Search ............ 369/36, 38, 39; 360/92, 360/98.04, 98.05, 98.06, 99.03, 99.07

[56] References Cited

U.S. PATENT DOCUMENTS

| 4,145,724 | 3/1979 | Medding et al. | 360/92 |
| 4,504,936 | 3/1985 | Faber et al. | 369/34 |
| 4,527,262 | 7/1985 | Manto | 369/38 |
| 4,614,474 | 9/1986 | Sudo | 369/191 |
| 4,675,856 | 6/1987 | Rudy et al. | 369/36 |

FOREIGN PATENT DOCUMENTS

| 49-24406 | 3/1974 | Japan . |
| 53-76809 | 7/1978 | Japan . |
| 57-198571 | 12/1982 | Japan . |
| 57-198572 | 12/1982 | Japan . |
| 58-14268 | 7/1983 | Japan . |
| 8601326 | 2/1986 | PCT Int'l Appl. ............ 369/34 |

Primary Examiner—Steven L. Stephan
Attorney, Agent, or Firm—Lowe, Price, LeBlanc, Becker & Shur

[57] ABSTRACT

An elevation mechanism for elevating a support member (7) of a picker (6) is suspended at its both ends by strings (17, 18). The strings (17, 18) are stretched to a pull-driving portion disposed at the back of aligned positions of information-storage regular articles (2) and in an upper portion of an information reader (5) through guide rollers (21, 22, 23, 24) located in an upper part of a housing (1).

11 Claims, 15 Drawing Sheets

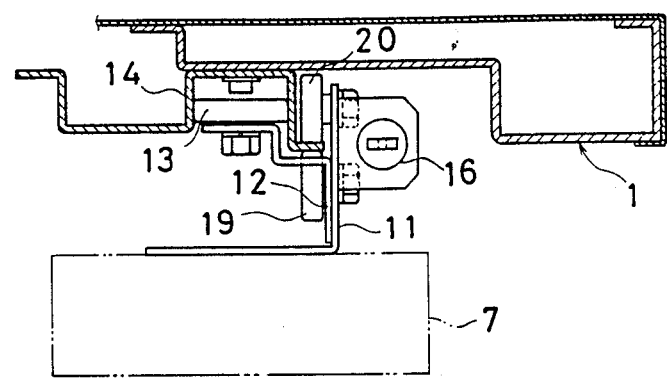
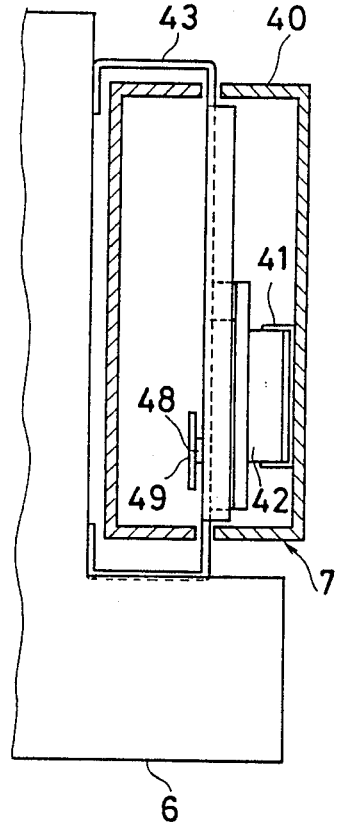
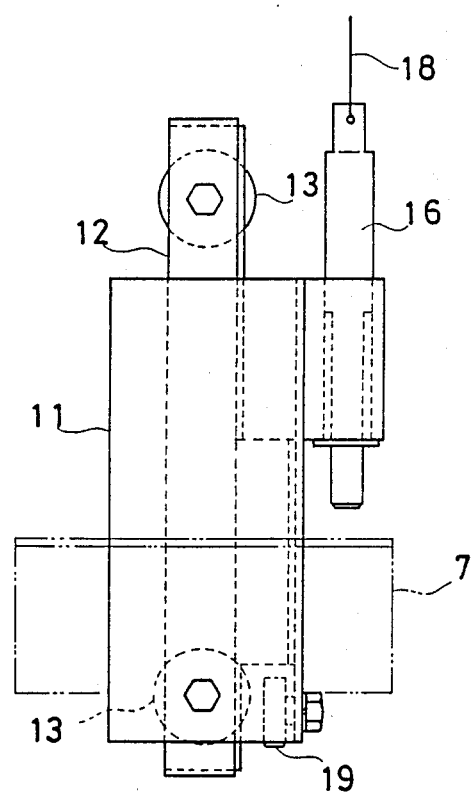

FIG. 7
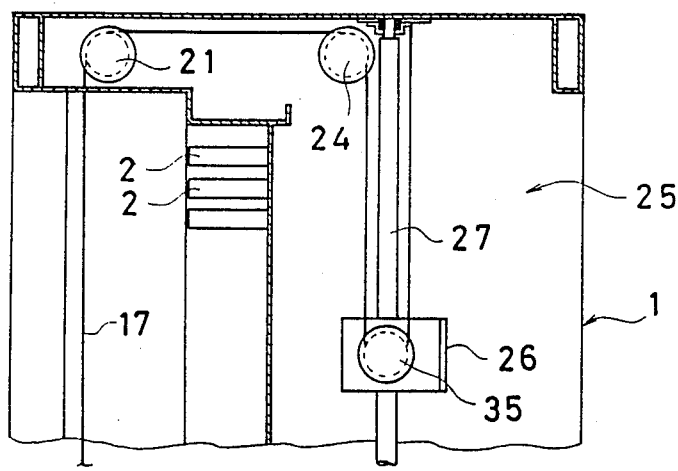
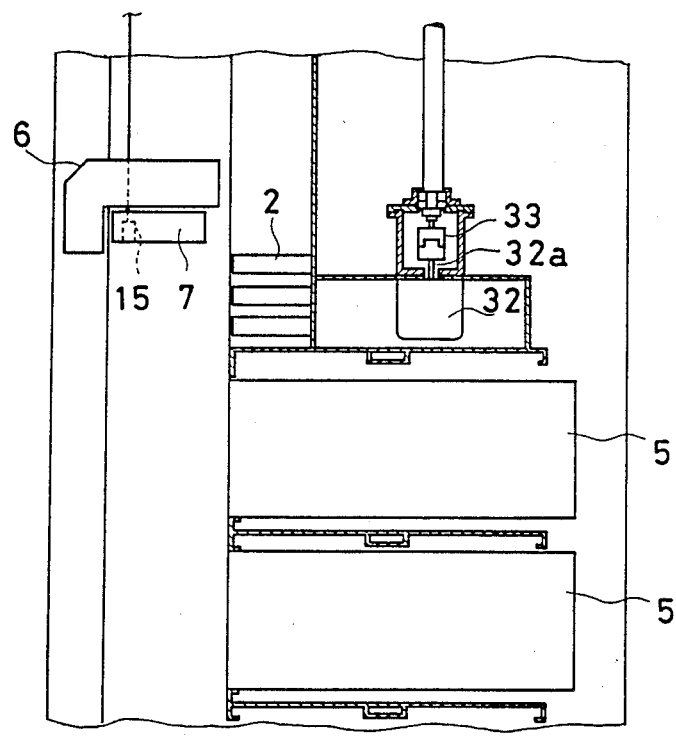

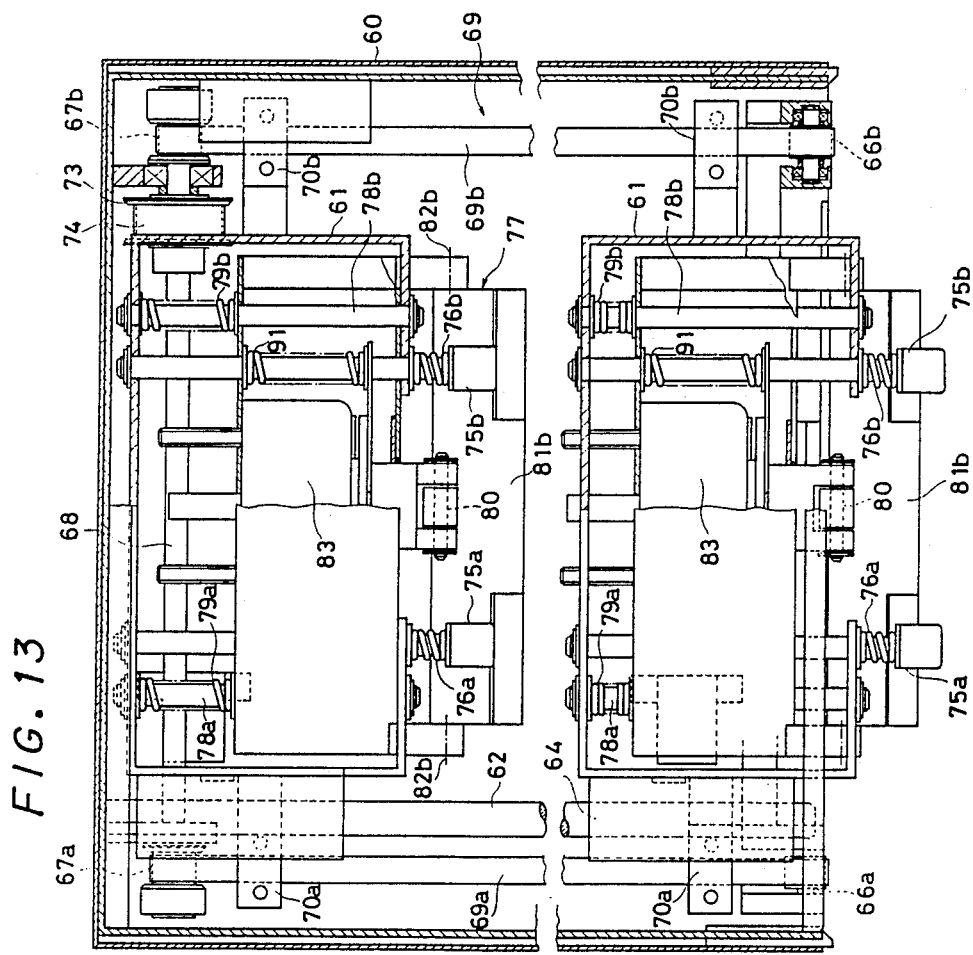

CARRIER APPARATUS FOR TAKING INFORMATION-STORAGE REGULAR ARTICLES IN AND OUT

This application is a continuation of application Ser. No. 159,591, filed as PCT JP87/00368 on Jan. 9, 1987, published as WO87/07751 on Dec. 17, 1987, now abandoned.

TECHNICAL FIELD

The present invention relates to a carrier apparatus for taking information-storage regular articles in and out, which automatically performs operation for mounting information-storage regular articles, such as video cassette tapes aligned in a housing on an information reader such as a video tape recorder provided in the same housing, and drawing out and returning the information-storage regular articles from the information reader to their original aligned positions.

BACKGROUND TECHNICS

In a conventional carrier apparatus for taking information-storage regular articles in and out, an actuator is provided in an upper or lower part of one side or both sides in a front surface side of a housing provided with the information-storage regular articles and an information reader in an aligned manner. A picker performing in-and-out operation for the information-storage regular articles or a picker support member is connected to one or more actuators through chains, etc., to raise and lower the picker by driving of the actuator.

In such a structure, however, the lateral width and depth of the housing are lengthened due to a necessity for ensuring a space for the actuator at the front of the housing, so that the entire apparatus is increased in size. Thus, the articles receiving efficiency is inferior as compared with the volume of the apparatus. Such a phenomenon is increasingly encountered as the number of information-storage regular articles to be stored is increased, since the actuator must also be increased in size.

In the conventional carrier apparatus for taking information-storage regular articles in and out, further employed is structure for gripping the information-storage regular articles by a grip device or for holding the same by a belt to take the articles in and out with respect to aligned positions thereof as well to an information reader.

In such a structure, however, the information-storage regular articles are constrained to be held in the vertical or horizontal direction, and hence a large friction force or defective receiving is caused in the receiving operation, and if a stop position of the grip device or belt is incorrect, even if a guide is provided on the aligned positions of the information-storage regular articles or the information reader side.

DISCLOSURE OF THE INVENTION

The present invention is proposed to solve the aforementioned problems in the prior art, and an object thereof is to provide a carrier apparatus for taking information-storage regular articles in and out, which can be compactly structured with no necessity for ensuring a specific space in a housing for receiving a mechanism for raising and lowering a picker, and more preferably, which can smoothly perform an in and-out operation without causing a large friction force or defective receiving in taking the information-storage regular articles in and out with respect to the aligned position thereof and to and from an information reader.

The present invention is directed to a carrier apparatus for taking information-storage regular articles in and out, for mounting the information storage regular articles vertically and transversely aligned in a housing on an information reader provided in a lower part in the same housing and returning the information-storage regular articles from the information reader to their original aligned positions.

In order to achieve the aforementioned object, according to the present invention an elevation mechanism, for raising and lowering a picker support member horizontally movably supporting a picker and for taking the information-storage regular articles in and out with respect to the aligned position thereof and to and from the information reader, along the housing front surface is formed by a pull-driving portion arranged at the back of the aligned position of the information-storage regular articles and in an upper space of the information reader and strings suspending both end portions of the picker support member and guided to the pull-driving portion through string guide members in the upper part of the housing. A space at the back of the housing, generally defined by the difference in depth size between the information-storage regular articles and the information reader, is utilized as a space for receiving the elevation mechanism.

Thus the principal part of the mechanism for raising and lowering the picker can be stored in the back space of the housing, whereby the entire apparatus can be compactly structured.

In a preferred embodiment of the present invention, the picker is formed by a conveyor carrying the information-storage regular articles in a front-rear direction to feed and draw the same, a driving source for driving the conveyor and a grip device linked with the conveyor so as to be moved in the front-rear direction with movement of the conveyor for gripping and drawing out the information-storage regular articles kept in their aligned positions and to and from the information reader. The receiving operation of the information-storage regular articles is performed only by a feeding action by the conveyor without gripping or holding of the article by a grip device, so that no excessive force is applied to the articles and no defective receiving is caused.

Thus, the information-storage regular articles may not be gripped or held to be received, and hence no high accuracy is required for positioning of the picker. Therefore, the positioning and the receiving operation can both be smoothly performed.

The aforementioned and related objects and effects of the present invention will become more apparent from the following description made with reference to the accompanying drawings.

BRIEF DESCRIPTION OF THE DRAWINGS

FIG. 4 is a horizontal sectional view showing a right end part side of the housing.

FIG. 5 is a front elevational view of the right end part side of the housing as viewed from the inner side.

FIG. 7 is a longitudinal sectional view of the housing as viewed from the side part side.

FIG. 12 is a longitudinal view of the picker support frame as viewed from the side part side.

FIG. 13 is a horizontal sectional view of a picker according to the present invention.

BEST MODE OF CARRYING OUT THE INVENTION

Figure 1:
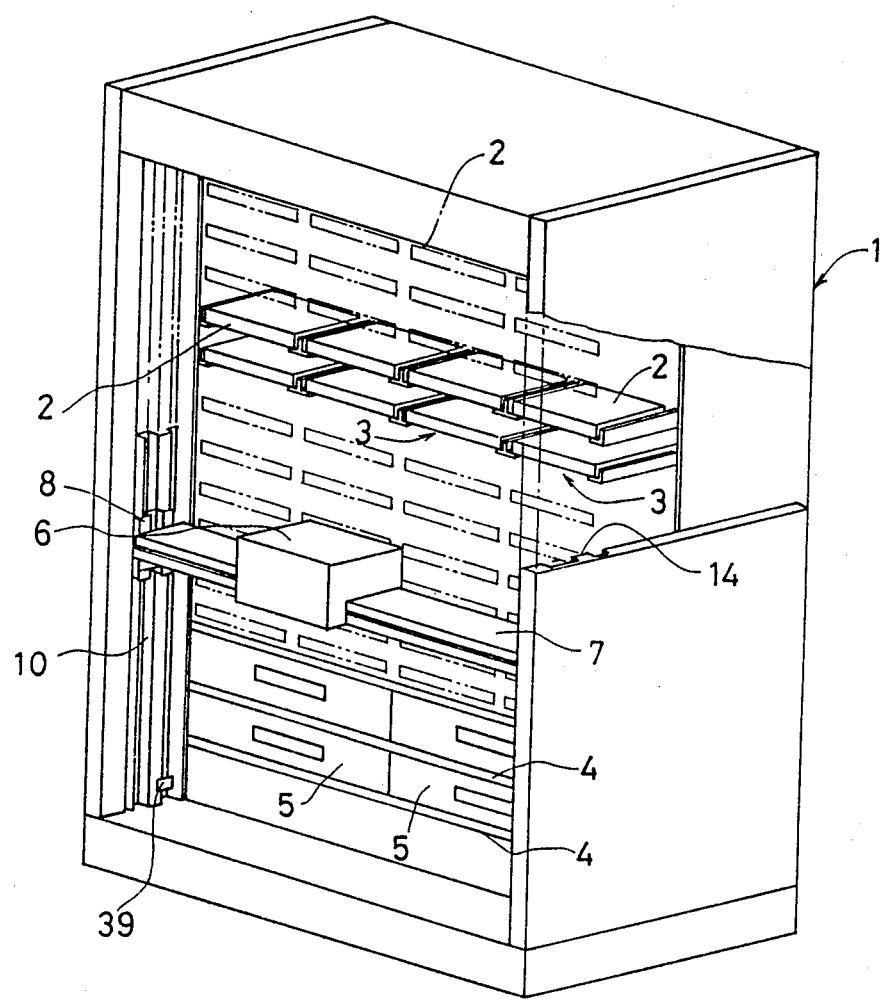
FIG. 1 is a perspective view illustrating an embodiment of a carrier apparatus for taking information-storage regular articles in and out according to the present invention.

FIG. 1 is a partially fragmented sketch perspective view illustrating an embodiment of a carrier apparatus for taking information-storage regular articles in and out according to the present invention. Referring to the FIG. 1 cassette racks 3 for aligning video cassette tapes 2 are formed in respective spaces divided into a plurality of columns by partition walls in an upper half part of a rack-shaped housing 1 the front surface is open. A lower half part of the housing 1 is provided with deck shelves 4 which are vertically divided into a number of stages, and video decks 5 are aligned/arranged in the deck shelves 4.

Figure 2:
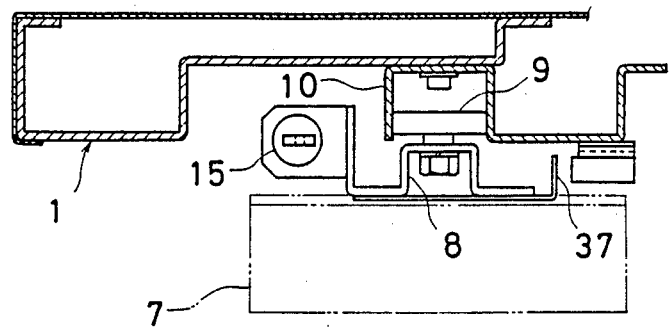
FIG. 2 is a horizontal sectional view showing a left end part side of a housing of the invention per claim 1.
Figure 3:
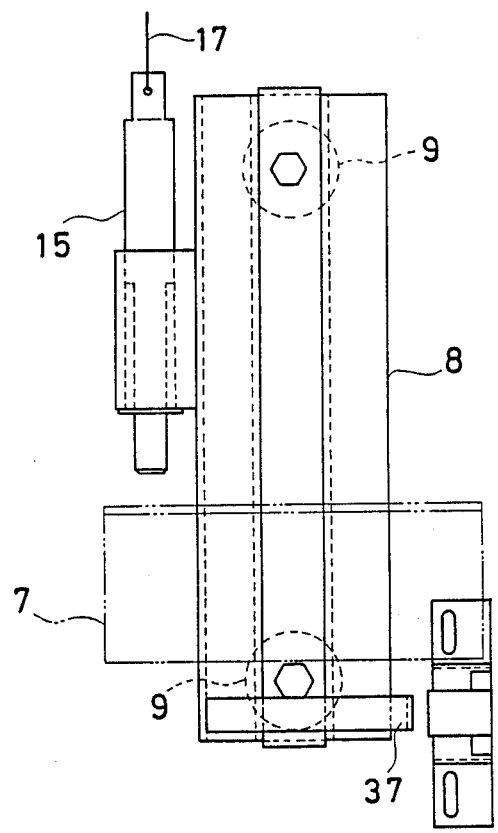
FIG. 3 is a front elevational view of the left end part side of the housing as viewed from the inner side.
Figure 8:
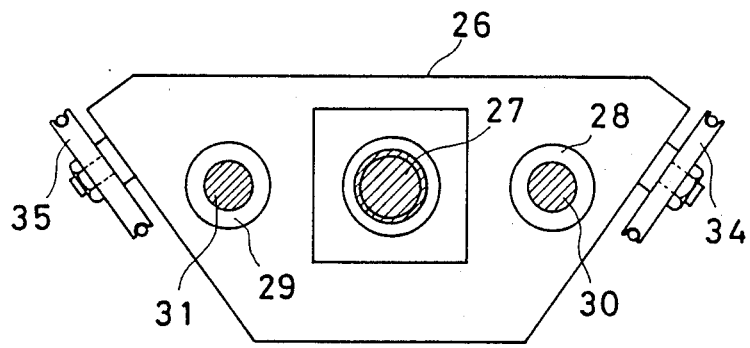
FIG. 8 is a plan view of a counter weight.

On the front side of the housing 1, a picker support frame 7 is laterally provided to horizontally and movably support a picker 6 along the front surface of the housing 1. A vertical pair of elevation guide rollers 9 are rotatably connected to an end portion of the picker support frame 7 through a mounting member 8 as shown in FIG. 2. A horizontal sectional view of the left end part side of the housing 1 is provided in FIG. 1, and FIG. 3 shows the left end part side from the inner side of the housing 1. The elevation guide rollers 9 are guided by a guide rail 10 longitudinally provided on the left end side wall of the housing 1, while a vertical pair of elevation guide rollers 13 are rotatably connected to the other end part of the picker support frame 7 through mounting members 11 and 12, as shown in FIG. 4 horizontally sectionally showing the right end part of the housing shown in FIG. 1 and FIG. 5 shows the right end part side from the inner side of the housing 1. The elevation guide rollers 13 are guided by a guide rail 14 longitudinally provided on the right end side wall of the housing 1. Thus, the picker support frame 7 is restricted so as not to be displaced in the front rear direction A rope fastening rod 15 is screwed to the mounting member 8 on the left end portion of the picker support frame 7 as shown in FIGS. 2 and 8, while a rope fastening rod 16 is screwed to the mounting member 11 on the right end portion of the picker support frame 7 as shown in FIGS. 4 and 5. The picker support frame is suspended by ropes 17 and 18 fastened to these rods 15 and 16. Another pair of elevation guide rollers 19 and 20, whose axes of rotation are directed to the front-rear direction of the housing 1, are rotatably connected to the right end portion of the picker support frame 7. An end portion of the guide rail 14 on the housing 1 side lies between these elevation guide rollers 19 and 20, whereby the picker support frame 7 is restricted not to be displaced in the crosswise direction of the housing 1.

Figure 6:
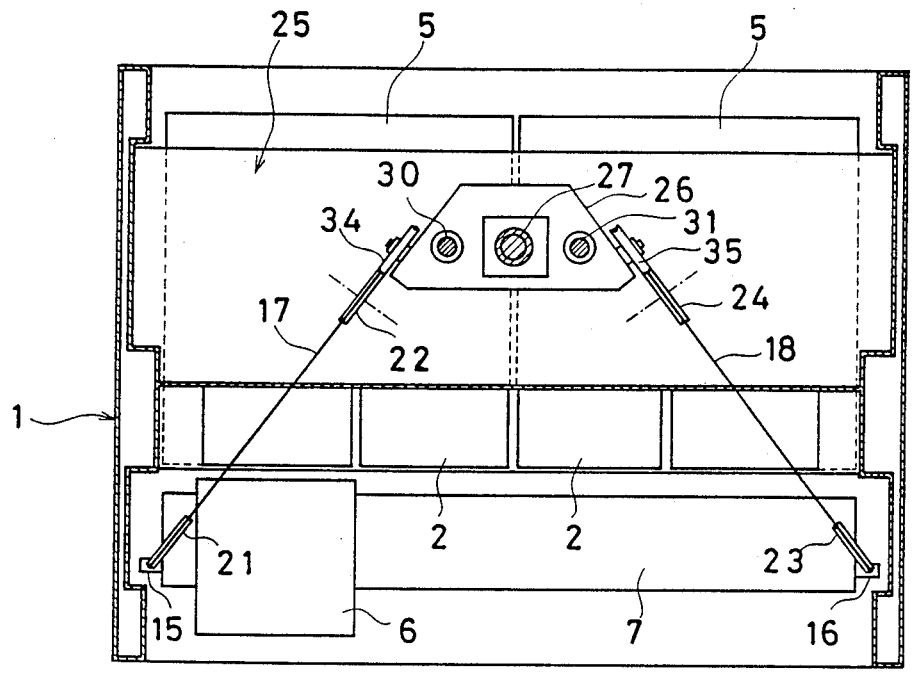
FIG. 6 is a horizontal sectional view of the housing.

FIG. 6 is a horizontal sectional view showing the upper part of the housing 1, and FIG. 7 is a longitudinal sectional view showing the right end part side of the housing 1 as viewed from the inner side. Referring to these figures, the left and right pair of ropes 17 and 18 suspending the picker support frame 7 are extended along rope guide rollers 21, 22, 23 and 24 which are rotatably connected to the upper part of the housing 1 to be guided toward the back center portion of the housing 1 from both of the left and right end portions.

Figure 9:
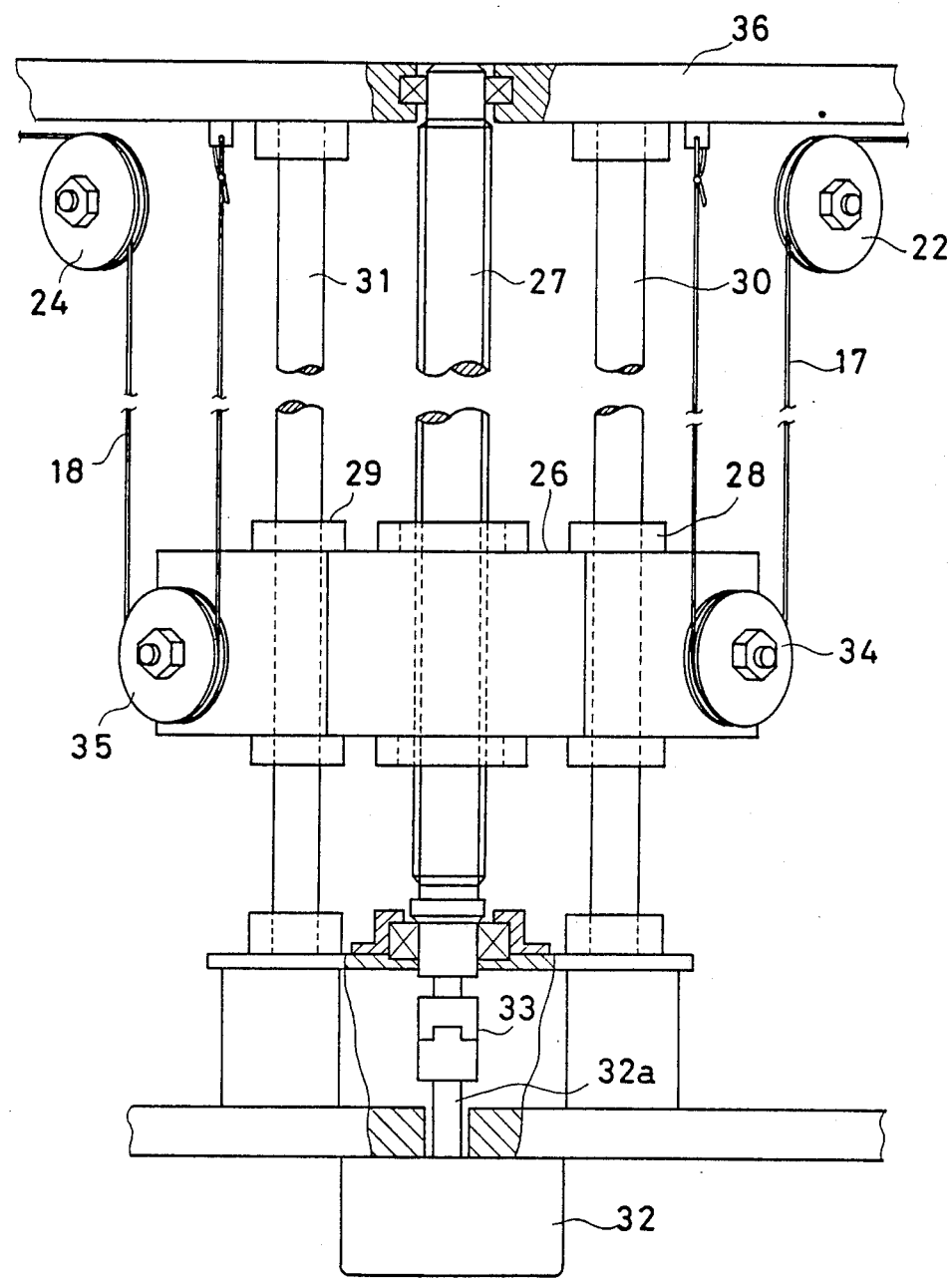
FIG. 9 is a front elevational view of a principal part of an elevation mechanism as viewed from the rear of the housing.

A prescribed space 25 is ensured in the back upper half part of the housing 1 by difference in depth between the video cassette tapes 2 arranged in the upper half part of the housing 1 and the video decks 5 arranged in the lower half part of the housing 1, and a counter weight 26 is provided to be movable vertically in this back space 25 as shown in FIGS. 6 and 7. A rotatable ball screw 27 vertically provided in the back space 25 is threadedly engaged in a central portion of the counter weight 26, as shown in FIGS. 8 and 9. Guide sleeves 28 and 29 provided on both end portions of the counter weight 26 are slidably engaged to a left and right pair of guide shafts 30 and 31 which are vertically provided in parallel with the ball screw 27, so that the counter weight 26 is guided by the guide shafts 30 and 31, through rotation of the ball screw 27, for upward and downward movement. The lower end portion of the ball screw 27 is coupled to a rotary shaft 32a of a motor 32 provided in the lower part of the back space 25 through a coupling 33, as shown in FIG. 9, so that the ball screw 27 is rotated by driving of the motor 32. As shown in FIG. 6 to FIG. 9, free rollers 34 and 35 are rotatably connected to left and right side surfaces of the counter weight 26, so that the left and right ropes 17 and 18 suspending the picker support frame 7 are wound on the free rollers 34 and 36 through rope guide rollers 21 and 22 and rope guide rollers 23 and 24 respectively, and terminating end portions of these ropes 17 and 18 are fixed to a top plate part 36 of the back space 26. The counter weight 26 is selected to be substantially matched in weight with the picker support frame 7 including the picker 6, so that vertical movement of the picker 6 can be performed by only a slight torque of the motor 32. Since the free rollers 84 and 36 of the counter weight 26 are utilized as running blocks, the distance of vertical movement of the counter weight may be half the required distance of vertical movement of the picker 6, whereby a compact pull-driving portion can be formed.

As shown in FIGS. 2 and 8, a reflecting surface member 37 is provided on the left end portion of the picker support frame 7. A reflection type photo-sensor 39 for detecting the origin of a raising and lowering operation region of the picker 6 is provided in a lower position of the guide rail 10 of the housing 1 as shown in FIG. 1. The reflecting surface member 37 on the picker support frame 7 therefore necessarily returns to a position opposite to the reflection type photo-sensor 39 for detecting the origin, upon power being supplied supply, to regularly operate with the position being the origin. Thus, even if the ropes 17 and 18 are extended, correction thereof is performed every time power is supplied. The origin position may be set in an upper position of the guide rail 10. In this embodiment, the picker support frame 7 is suspended by the ropes 17 and 18 as hereinabove described, whereby no accessories such as a tensioner are required to adjust the vertical position thereof and tension adjustment in assembling can also be omitted.

Figure 10:
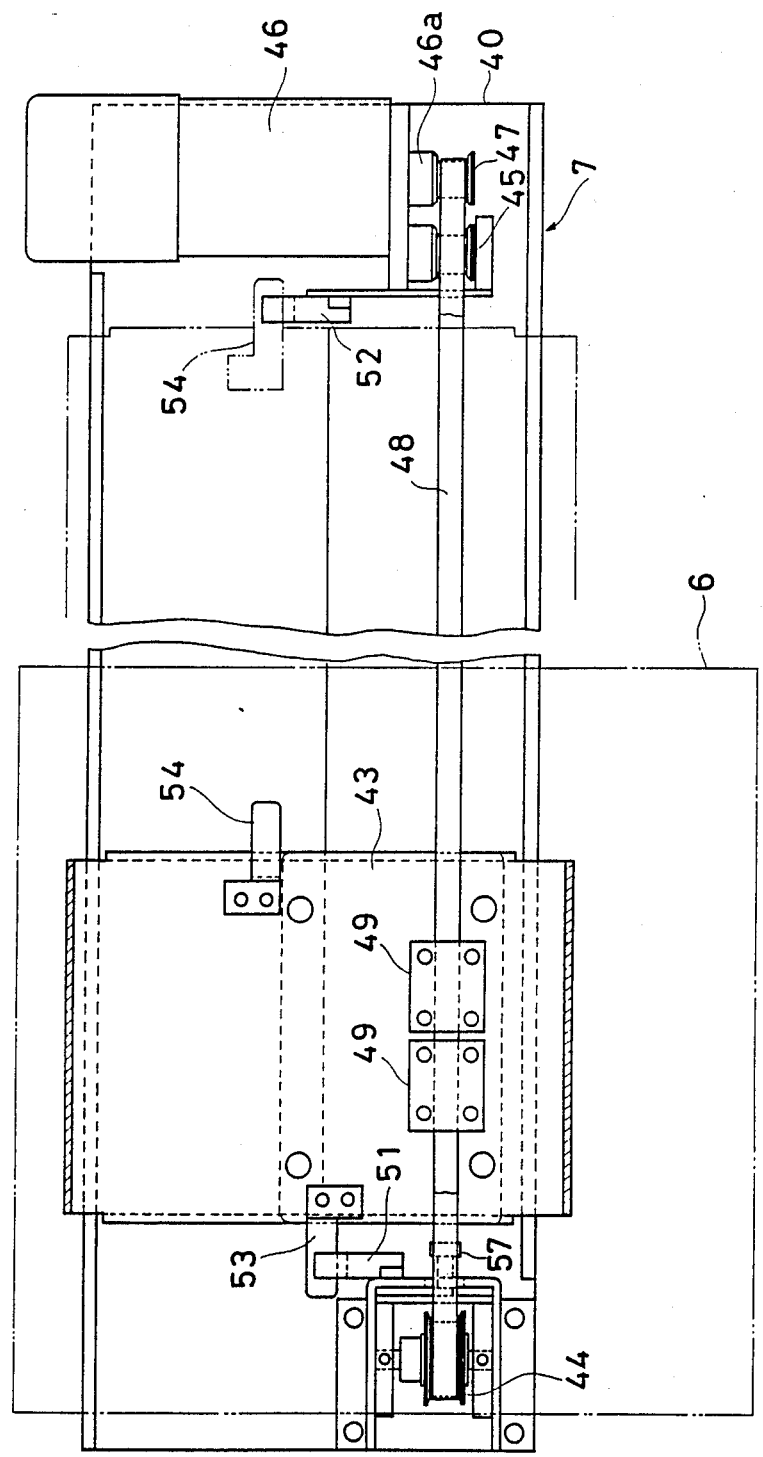
FIG. 10 is a plan view of a picker support frame according to the present invention.
Figure 11:
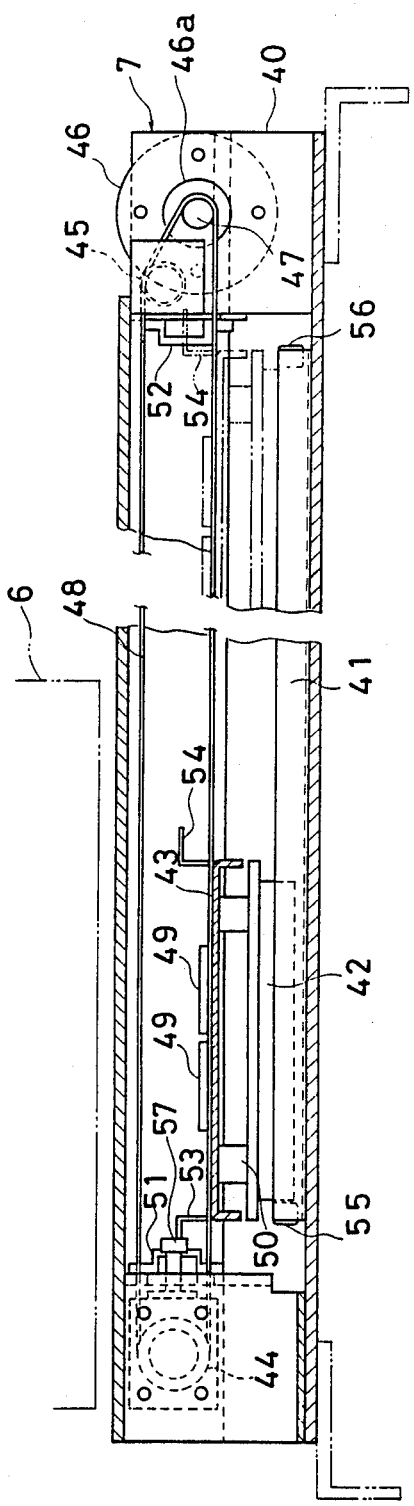
FIG. 11 is a longitudinal sectional view of the picker support frame as viewed from the front side.

FIG. 10 is a horizontal sectional view of the picker support frame 7, FIG. 11 is a longitudinal sectional view showing the picker support frame 7 as viewed from the front side and FIG. 12 is a longitudinal sectional view as viewed from the right side. Referring to these figures, a body case 40 of the picker support frame 7 has a cylindrical shape of substantially quadrangular section, and a transversely extending guide rail 41 is arranged in the body case 40. A picker mount 43 is movably placed on the guide rail 41 through a slider 42. A pulley 44 is provided on a left end part side in the body case 40 and a pulley 45 and a motor 46 are provided on a right end part side in the body case 40. The picker mount 43 is fixed to a part of an endless belt 48, extended along the pulleys 44 and 45 and a pulley 47 of a rotary shaft 46a of the motor 46, through a coupling plate 49. The endless belt 48 is driven by the motor 46 so that the picker mount 43 is leftwardly and rightwardly moved along the guide rail 41. A shock-absorbing rubber member 50 is interposed between the picker mount 43 and the slider 42.

Limit switches 51 and 52 for detecting final ends are provided on the left end part and the right end part in the body case 40 and working members 53 and 54 acting on the respective limit switches 51 and 52 are provided on the left end part and the right end part of the picker mount 43, so that the working member 53 acts on the limit switch 51 to stop driving of the motor 46 when the picker mount 43 reaches a prescribed left end position while the working member 54 acts on the limit switch 52 to stop driving of the motor 46 when the picker mount 43 reaches a prescribed right end position. Stoppers 55 and 56 are provided on the left and right ends of the guide rail 41 respectively, so that the picker mount 43 is stopped by the stoppers 55 and 56 in case of an emergency, e.g. where control by the limit switches 51 and 52 is not effective. Referring to FIGS. 10 and 11, numeral indicates a tension adjustment screw for the endless belt 48.

Figure 14:
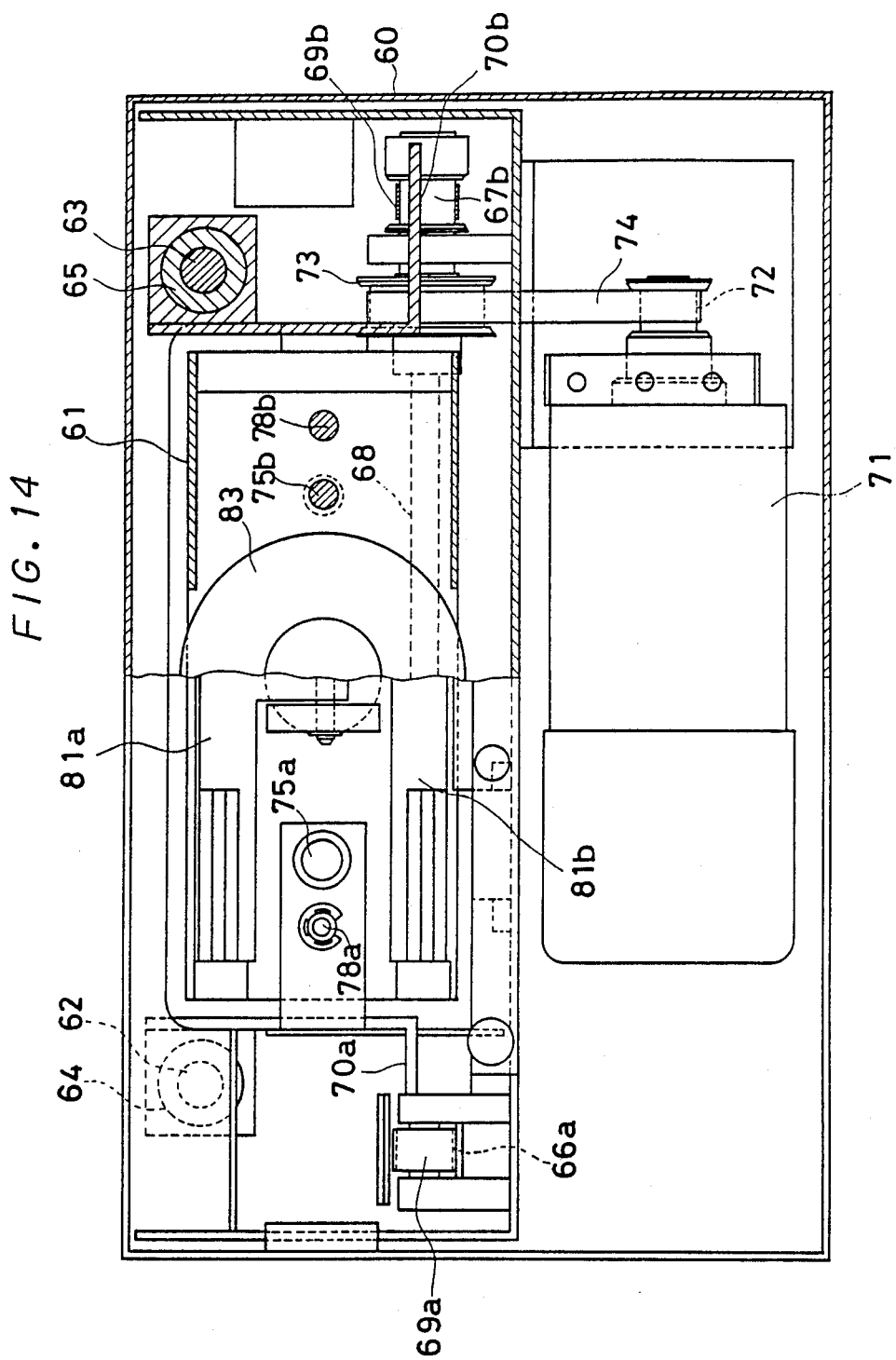
FIG. 14 is a longitudinal sectional view of the picker as viewed from the front side
Figure 15:
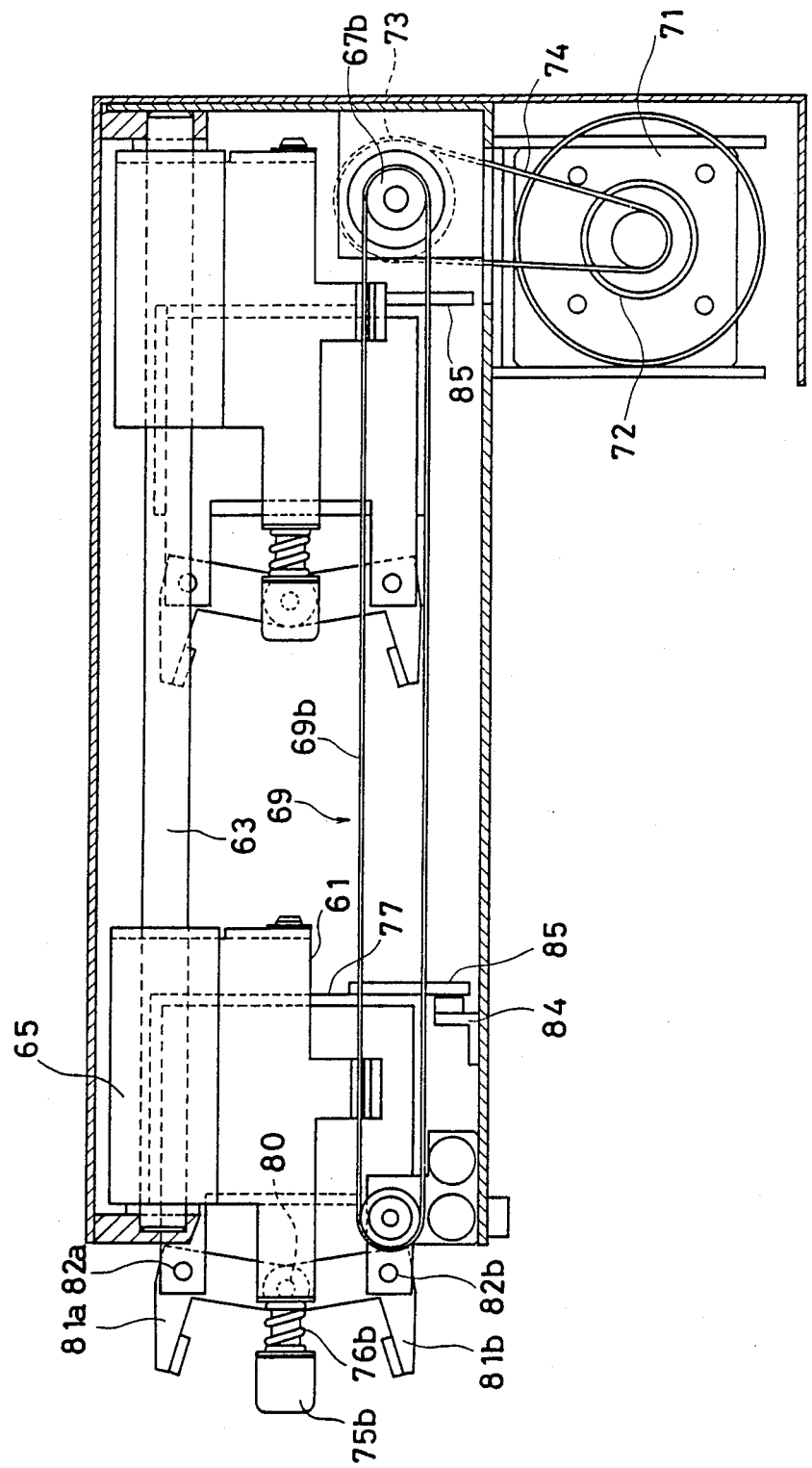
FIG. 15 is a longitudinal view of the picker as viewed from the side part side.

FIG. 13 is a horizontal sectional view partially fragmentedly showing the picker 6, FIG. 14 is a front elevational view showing the picker 6 with a right half portion being longitudinally in section, and FIG. 15 is a longitudinal sectional view of the picker as viewed from the right side. Referring to these figures, a body case 60 of the picker 60 is fixed to the picker mount 43, and a box member 61 is provided so as to be frontwardly and rearwardly movable in the body case 60. Slide shafts 62 and 63 are provided in parallel on left and right side portions in the body case 60 toward a front-and-rear direction, while slide bearings 64 and 65, to be engaged with the slide shafts 62 and 63 respectively, are provided on left and right side portions of the box member 61, so that the box member 61 is movably supported by the slide shafts 62 and 63. Furthermore, a left and right pair of pulleys 66a and 66b and pulleys 67a and 67b are provided in front and rear portions in the body case 60. Pulleys 67a and 67b are coupled by a driving shaft 68, and endless belts 69a and 69b are extended between the pulleys 66a and 67a and between the pulleys 66b and 67 b respectively, to form a belt conveyor 69. Mounting members 70a and 70b formed on both end portions of the box member 61 is fixed to the endless belt 69a and 69b respectively, so that the box member 61 is frontwardly and rearwardly movable by driving of the belt conveyor 69 under guidance by the slide shafts 62 and 63. FIG. 13 shows states in which the box member 61 is in a rear portion and in a front portion.

Further, the driving shaft 68 in a rear portion of the body case 60 is coupled to a motor 71, which is provided in a rear lower position of the body case 60, through pulleys 72 and 73 and an endless belt 7 4 as shown in FIG. 15, so that the belt conveyor 69 is driven by the motor 7 1. Frontwardly projecting pushers 75a and 75b are reciprocably provided on left and right end portions of the box member 61. They are urged in projecting directions by compression coil springs 76a and 76b.

A grip device 77 is provided in the box member 61. This grip device 77 is slidably (i.e., relatively movably with respect to the box member 61 in front-and rear direction) supported by slide shafts 78a and 78b provided in parallel on both side portions of the box member 61 in the front-and-rear direction, and is urged forwardly by compression coil springs 79a and 79b engaged to the slide shafts 78a and 78b.

A vertical pair of grasp pawls 81a and 81b, rear parts of which are pivotally connected with each other by a shaft 80, are provided in the front portion of the grip device 77, and intermediate left and right ends of the respective grasp pawls 81a and 81b are pivotally supported by pins 82a and 82b, respectively, as shown in FIGS. 13 and 15 (FIG. 13 shows only the left and right pins 82b of the lower grasp pawl 81b by one-dot chain lines), so that switch operation is performed with support points of the pins 82a and 82b. A solenoid 83, having a plunger which is coupled to the shaft 80 pivotally coupling the grasp pawls 81a and 81b, is arranged in a rear part of the grip device 77, so that the vertical pair of grasp pawls 81a and 81b switch-operate by reciprocation of the plunger of the solenoid 83. The shaft 80 is frontwardly urged by a spring 91 wound on shafts of the pushers 75a and 75b, so that the grasp pawls 81a and 81b are normally in open states and closed against spring force by energization of the solenoid 83.

Further, a stopper 84 is provided in a prescribed position of the front part in the body case 60, so that a working member 85 suspended from a rear part of the grip device 77 comes into contact with the stopper 84, to prevent advance of the grip device 77. When advance of the grip device 77 is thus prevented, the motor 71 is further driven so that only the box member 61 advances against spring force of the springs 79a and 79b, to allow projection of the pushers 75a and 75b.

Figure 16:
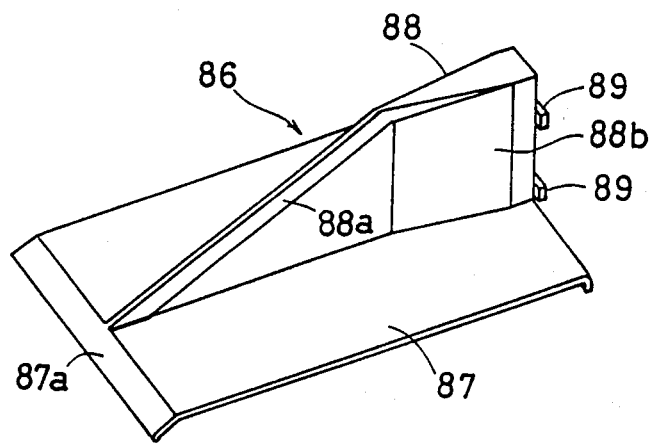
FIG. 16 is a perspective view showing a unit member of a cassette rack.
Figure 17:
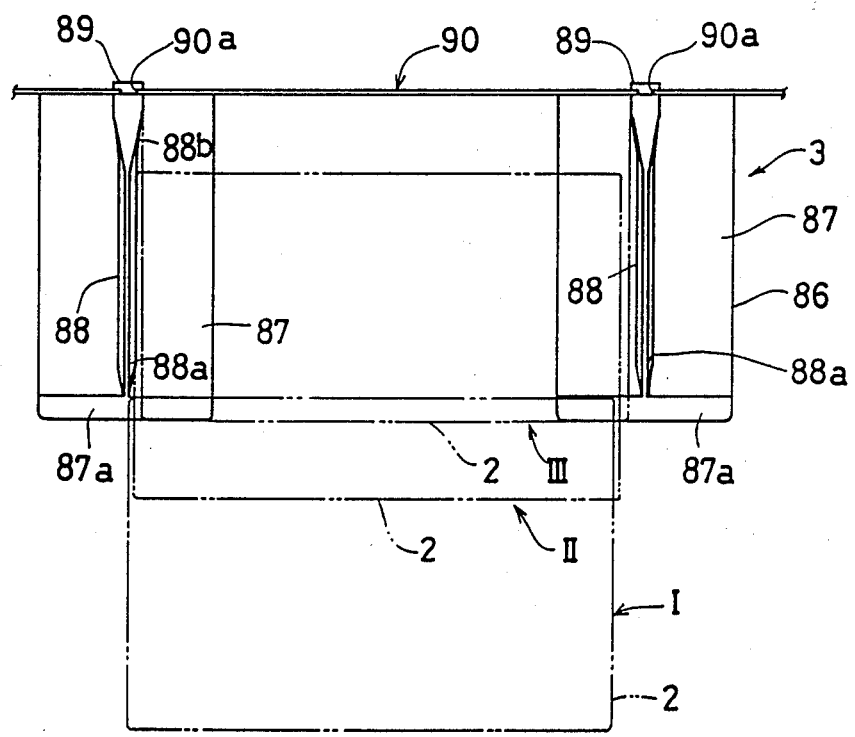
FIG. 17 is an explanatory view showing an operation for storing a video cassette tape in the cassette rack.

FIG. 16 is a perspective view showing each unit member 86 forming the aforementioned cassette rack 3, and FIG. 17 is a plan view of an assembled state thereof. Referring to these figures, each unit member 86 of the cassette rack 3 is formed by a support plate 87 provided with a downwardly inclined guide surface 87a in its forward end portion and a partition wall 88 vertically upwardly provided on an intermediate position of the support plate 87. A tapered guide surface 88a is formed on a front edge portion of the partition wall 88, and a rearwardly changing tapered guide surface 88b is formed in a rear side surface of the partition wall 88. A T-shaped stop portion 89 formed in a rear end of the partition wall 88 is brought into stop contact with a slit 90a of a mount plate 90 shown in FIG. 17, which is transversely provided in the housing 1, whereby respective unit members 86 are mounted at regular intervals as shown in the figure to form the cassette racks 3.

Figure 18:
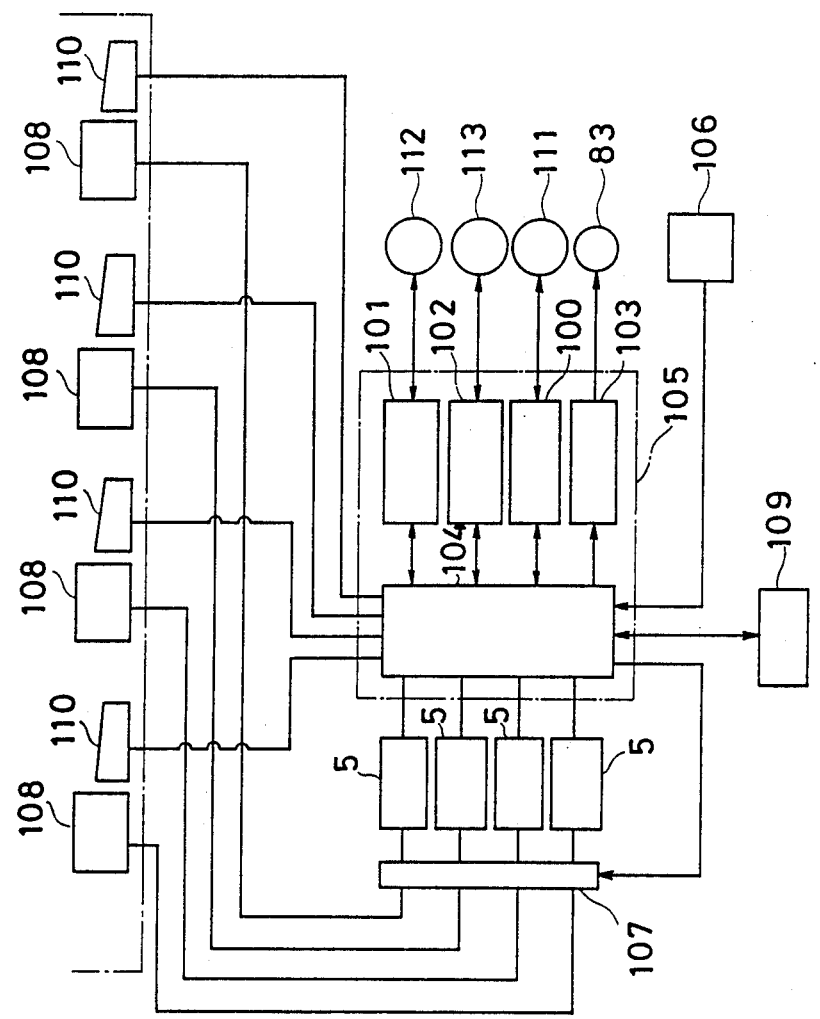
FIG. 18 is a block diagram depicting a control system.

FIG. 18 is a block diagram showing a control system of the apparatus according to this embodiment. Referring to the figure, numeral 100 indicates a Z-axis motor driver for driving the motor 32 of the aforementioned elevation mechanism, numeral 101 indicates an X-axis motor driver for driving the motor 46 of the picker support frame 7, numeral 102 indicates a Y-axis motor driver for driving the motor 7 I of the picker 6 and numeral 108 indicates a solenoid driver for driving the solenoid 83 of the grip device 77. A control device 105 is formed by the respective drivers 100 to 103 and a microcomputer 104 for controlling the same. Numeral 111 indicates an encoder which is provided on the motor 32 of the elevation mechanism, and the microcomputer 104 is adapted to detect the vertical position of the picker 6 by counting pulses of the encoder 111. Numeral 112 indicates an encoder which is provided on the motor 46 of the picker support frame 7, and the microcomputer 104 detects the transverse position of movement of the picker 6 by counting pulses of the encoder 112. Numeral 113 indicates an encoder which is provided on the motor 7 1 of the picker 6, and the microcomputer 104 detects an advance position of the picker 6 by counting pulses of the encoder 113.

Detection signals of various sensors 106 such as the limit switches 51 and 52 in the picker support frame 7 are inputted to the microcomputer 104, which in turn outputs prescribed control commands. Further, electrical connection is so made that operations of the respective video decks 5 arranged in the lower half part of the housing 1 are also controlled by the microcomputer 104. A switcher 107 is controlled by a switching signal from the microcomputer 104, so that the respective video decks 5 and respective televisions 108 in remote areas such as respective classrooms of schools, for example, can be arbitrarily switched to be connected. Numeral 109 indicates a monitor operation panel, and numeral 110 indicates respective operation panels on the remote sides.

The operation of this apparatus now be described. When a command for reproducing a prescribed video cassette tape 2 is supplied from one of the operation panels 110 in a remote side shown in FIG. 18 to the microcomputer 104 of the control device 105, the control device starts control of mounting this selected video cassette tape 2 on a non-used arbitrary video deck 5 as follows.

First, the motor 32 in the back space 25 of the housing 1 starts driving, so that the counter weight 26 is vertically moved by rotation of the ball screw 27. Consequently, the picker support frame 7 suspended by the ropes 17 and 18 is vertically moved. Following the vertical movement of the picker support frame 7, the microcomputer 104 counts pulses of the encoder 111 of the motor 32. When the microcomputer 104 counts a pulse corresponding to the vertical position of the designated cassette rack 3, the vertical movement is stopped and the height of the picker 6 is positioned. In power supply to the apparatus, first, the picker support frame 7 temporarily returns to the lower position where the origin detecting photo-sensor 39 shown in FIG. 1 outputs a detection signal, then it substantially starts the vertical movement therefrom. Therefore, even if change is caused such as to distort position accuracy, such that the ropes 17 and 18 are loosened in a non-use state, the vertical movement is regularly started with the prescribed origin position as a starting point. Thus, a position correction is automatically performed in this apparatus.

In the picker support frame 7, the motor 46 is driven so that the endless belt 48 operates, whereby the picker 6 coupled to the endless belt 48 through the picker mount 43 travels horizontally. Following this operation, the microcomputer 104 counts pulses of the encoder 112 of the motor 46. When the microcomputer 104 counts a pulse corresponding to the position of the designated cassette rack 3, the transverse movement of the picker 6 is stopped and a lateral position of the picker 6 is positioned. Through the aforementioned operation, the picker 6 is stopped in front of the desired video cassette tape 2.

Figure 20:
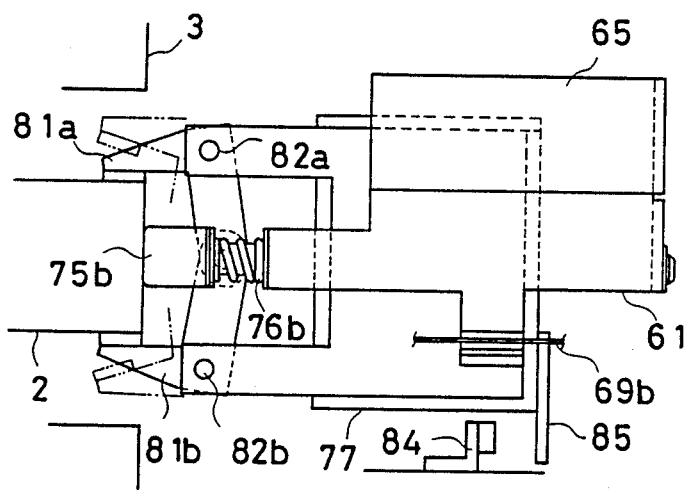
FIG. 20 is an explanatory view showing an operation for taking out the video cassette tape from the cassette rack.

Then, the motor 71 in the body case 60 of the picker 6 starts and the rotation thereof is transmitted to the drive shaft 68 through the pulley 72, the endless belt 74 and the pulley 73, whereby the belt conveyor 69 operates. Thus, the box member 61 fixed to the endless belts 69a and 69b of the belt conveyor 69 advances. FIG. 13 and FIG. 15 show states in which the box member 61 retracts and advances. In such advancing operation, no current is supplied to the solenoid 83 of the grip device 77, and the grasp pawls 81a and 81b maintain open conditions. When forward ends of the pushers 75a and 75b reach a position to where contact is made with the front surface of the video cassette tape 2 in the cassette rack 4 so that advance of the box member 61 is blocked, as shown in FIG. 20, current is supplied to the solenoid 83 so that the shafts 80 of the grasp pawls 81a and 81b are rearwardly attracted. Therefore, the respective grasp pawls 81a and 81b are rotated about the pins 82a and 82b respectively in closing directions, whereby the front part of the video cassette tape 2 is grasped by the grasp pawls 81a and 81b. Thereafter, the motor 71 is drived in a direction reverse to that employed in advancing operation, and the belt conveyor 69 starts operation toward a retraction side. Thus, the box member 61 retracts and the video cassette tape 2 grasped by the grasp pawls 81a and 81b is drawn out from the cassette rack 3, moved along curved portions (pulley winding portions) at the front ends of the left and right endless belts 69a and 69b, and is placed on the belt conveyor 69. In this state, it is rearwardly carried at the same speed as the box member 61 which is driven by the belt conveyor 69. Thus, a strong grasping force not required for the grasp pawls 81a and 81b.

Dislocation movement of the video cassette tape 2, in drawing out, in the left, right and depthward directions, can be accomodated by sufficiently providing a passing space for the video cassette tape 2 in the picker 6. Thus, unnecessary friction between the video cassette tape 2 and the outer wall of the picker 6 is avoided so that the video cassette tape 2 is protected against scratches and the like. Dislocation in the vertical direction can be coped with by the aforementioned movement of the video cassette tape 2 along the front end curved portions of the left and right endless belts 69a and 69b. If the apparatus is so structured that the grip device 77 has a slight degree of freedom (rattling) with respect to the slide shafts 78a and 78b, the grasp pawls 81a and 81b are moved freely vertically in response to the dislocation of the video cassette tape 2, to protect the video cassette tape 2.

Figure 21A:
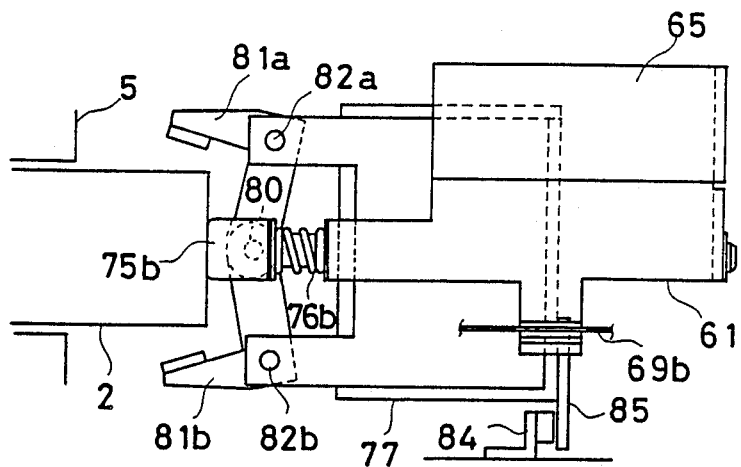
FIG. 21(A) and FIG. 21(B) are explanatory views showing an operation for mounting a video cassette tape on a video deck.
Figure 21B:
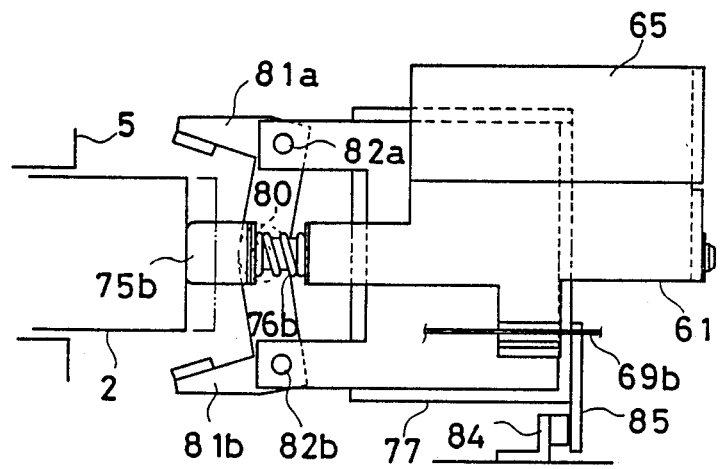

Thereafter, the vertical position and the transverse position of the picker 6 are changed by an operation substantially similar to the one described above, and the picker 6 is stopped in front of the designated video deck 5. Then, the video cassette tape 2 is mounted in the video deck 5 by the picker 6. In the advancing operation at this time, the grasp pawls 81a and 81b are held in open conditions as shown in FIG. 21(A), and the video cassette tape 2 is carried in a state of being simply placed on the belt conveyor 61. The pushers 75a and 75b serve as pushers in the case where sliding is caused between the video cassette tape 2 and the belt conveyor 61. When the front part of the video cassette tape 2 reaches the video deck 5, so that feeding by the belt conveyor 61 become impossible, the video cassette tape 2 is in turn urged into the video deck 5 by pushing operation of the pushers 75a and 75b following advancing movement of the box member 61. In this operation, advancing of the grip device 77 is prevented since the Working member 85 is brought into contact with the stopper 84, while driving of the belt conveyor 69 is still continuously performed. Thus, the box member 61 further advances against urging force of the compression coil springs 79a and 79b interposed between the grip device 77 and the box member 61, and the pushers 78a and 75b followingly project to force the video cassette tape 2 into the video deck 5 as shown in FIG. 21(B). The amount of such forcing is so set as to reach a range in which a lead-in mechanism of the video deck 5 can start operation, and thereafter the video cassette tape 2 is mounted in the video deck 5 by operation of the video deck 5. The compression coil springs 76a and 76b are interposed between the head portions of the pushers 75a and 75b and the front surface of the box member 61, and hence, even if an irrational pushing operation is performed by the pushers 75a and 75b, e.g., without working of the lead-in mechanism of the video deck 5 only the box member 61 advances against the compression coil springs 76a and 76b , so that the video cassette tape 2 is not damaged. A guide may be provided in an inlet of the video deck 5, in order to correct feed dislocation of the video cassette tape 2.

Figure 19:
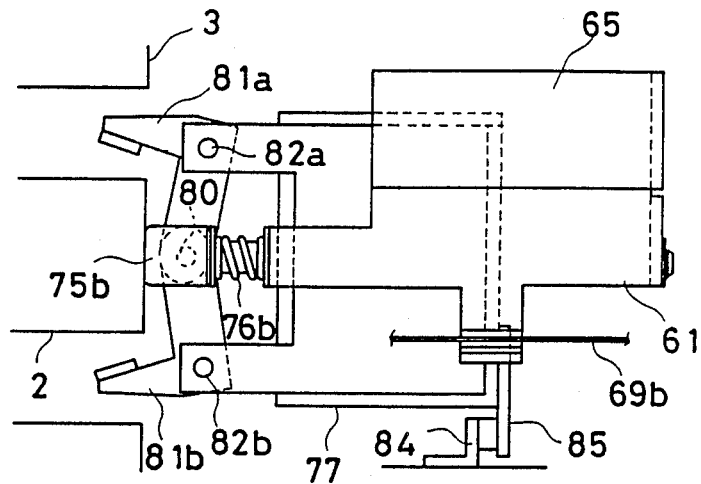
FIG. 19 is an explanatory view showing an operation for putting the video cassette tape in the cassette rack.

The operation for taking out the video cassette tape 2 from the video deck 5 is similar to the aforementioned operation for taking out the video cassette tape 2 from the cassette rack 3. The operation for returning a video cassette tape 2 taken out from the video deck to the original cassette rack 3 is also substantially similar to the aforementioned operation for mounting the same on the video deck 5, and the operating state thereof is shown in FIG. 19. In this operation, however, the forcing operation by the pushers 75a and 75b after stoppage of the grip device 77 is unnecessary and hence operation of the belt conveyor 69 is stopped in a position where the working member 85 of the grip device 77 is in contact with the stopper 84. Further, in the case of the operation for forcing the video cassette tape 2 into the cassette rack 3, the video cassette tape 2 is not grasped by the grasp pawls 81a and 81b as hereinabove described but simply placed on the belt conveyor 69 to be carried to an intermediate position and finally simply forced by the pushers 76a and 75b. Therefore, even if the position for forcing the video cassette tape 2 is slightly displaced from the position of the cassette rack 3, such displacement is smoothly corrected by the respective guides 87a, 88a and 88b provided in the unit member 86 forming the cassette rack 3, as shown by phantom lines in FIG. 17. Referring to the figure, the video cassette tape 2 dislocatedly carried toward the cassette rack 3 is first subjected to correction of vertical displacement by the guide surface 87a in the front end portion of the support plate 87, while transverse displacement is corrected by the guide surface 88a in the front edge of the partition wall 88, as shown by the symbol I in the figure. Then, when at least a half portion of the video cassette tape 2 is introduced into the cassette rack 3, transverse displacement is further corrected as shown by the symbol II by the guide surface 88b in the rear portion of the partition wall 88. Thus, the video cassette tape 2 is finally received in a correct position, as shown by the symbol III. Although this embodiment shows the case where the guide mechanism is added to only the cassette rack 3, a similar guide mechanism may be added to the video deck 5 as hereinabove described.

Although only the case of mounting the video cassette tape 2 on the video deck 3 and returning the same from the video deck 5 to the original cassette rack 3 is described in the above, the present invention is applicable to the case of taking regular articles storing information, such as video disks, floppy disks and the like, in and out of an information reader, as a matter of course.

Although the present invention has been described in detail with reference to an embodiment shown in the drawings, the present invention is not restricted to the aforementioned embodiment. The scope of the present invention is to be defined by the appended claims.

We claim:
1. An apparatus for placing information-storage regular articles at selected aligned positions aligned vertically and transversely within a predetermined depth inside a housing that has front and back portions and for transferring the articles between said aligned positions and an information reading means, comprising:
  information reading means for reading information from said articles, having a greater depth with respect to a front-to-back direction within the housing than is required for said aligned positions and located at a lower portion of the housing to be in a predetermined alignment with respect to said aligned positions and adjacent to said front portion of said housing so that a space is defined between said aligned positions of said articles within said housing and said back portion of said housing and above said information reading means;
  a picker movable between said front portion of said housing and said aligned positions for taking said articles in and out of said aligned positions and to and from the information reading means;
  a picker support member having two ends, horizontally provided between said front portion of said housing and said aligned positions, for movably supporting thereon said picker;

an elevation mechanism for raising and lowering said picker support member, said elevation mechanism comprising a pull-driving portion arranged in said space; and strings suspending both end portions of said picker support member and guided to said pull-driving portion through string guide members located in an upper part of the housing, said pull-driving portion pulling/loosening said strings to raise/lower said picker support member together with said picker supported thereon.

2. A carrier apparatus for taking information-storage articles in and out in accordance with claim 1, wherein:

said picker comprises a conveyor for moving the articles along said front-to-back direction to feed and draw out the articles;

a second driving source for driving said conveyor; and a grip device linked with said conveyor to be frontwardly and rearwardly moved with said front-to-back movement of said conveyor for gripping and drawing out the articles from the aligned positions and from the information reader.

3. A carrier apparatus for taking information-storage regular articles in and out in accordance with claim 2, wherein:

said picker further comprises a transfer base fixed to said conveyor;

a pusher mounted on said transfer base to frontwardly push out the articles on said conveyor; and a stopper for limiting movement of said grip device, said grip device being arranged on said transfer base and frontwardly urged to be relatively movable along said front-to-back direction with respect to said transfer base, advancing movement of said grip device being prevented by said stopper so that only said transfer base is advancingly driven, whereby said pusher projections over a grasping portion of said grip device.

4. A carrier apparatus for taking information-storage regular articles in and out in accordance with claim 3, wherein:

said pusher is arranged on said transfer base movably along said front-to-back direction in frontwardly urged manner.

5. A carrier apparatus for taking information-storage articles in and out in accordance with claim 1, wherein:

said pull-driving portion comprises vertically movable free rollers; and said strings are fixed to the upper part of said housing and are guided by said string guide members and by said free rollers.

6. A carrier apparatus for taking information-storage articles in and out in accordance with claim 5, wherein:

said pull-driving portion comprises a weight arranged to be guided in vertical motion in said housing, said weight being formed for rotatably supporting said free rollers in positions to guide said strings; and a first driving source for driving said weight in a vertical direction.

7. An apparatus for placing information-storage regular articles at selected aligned positions aligned vertically and transversely within a predetermined depth inside a housing that has front and back portions and for transferring the articles between said aligned positions and an information reading means, comprising:

information reading means for reading information from said articles, having a greater depth with respect to a front-to-back direction within the housing than is required for said aligned positions and located at a lower portion of the housing to be in a predetermined alignment with respect to said aligned positions and adjacent to said front portion of said housing so that a space is defined between said aligned positions of said articles within said housing and said back portion of said housing and above said information reading means;

a picker movable between said front portion of said housing and said aligned positions for taking said articles in and out of said aligned positions and to and from the information reading means;

a picker support member having two ends, supporting said picker to enable horizontal movement thereof, said picker support member itself being movable along a front surface of said housing;

an elevation mechanism for raising and lowering said picker support member, said elevation mechanism comprising a pull-driving portion arranged in said space; and strings suspending both end portions of said picker support member and guided to said pull-driving portion through string guide members located in an upper part of the housing, wherein said pull-driving portion comprises vertically movable free rollers; and said strings are fixed to the upper part of said housing and are guided by said string guide members and by said free rollers.

8. A carrier apparatus for taking information-storage regular articles in and out in accordance with claim 7, wherein:

said pull-driving portion comprises a weight arranged to be guided in vertical motion in said housing, said weight being formed for rotatably supporting said free rollers in positions to guide said strings; and a first driving source for driving said weight in a vertical direction.

9. A carrier apparatus having a front and a back, for taking information-storage regular articles in and out from selected aligned positions, and for mounting the articles vertically and transversely aligned within said housing on an information reader that is provided in the same housing and returning the information-storage regular articles to original aligned positions provided therefor in said information reader, said carrier apparatus comprising:

a picker for taking said articles in and out of said aligned positions thereof and to and from the information reader;

said picker comprising a conveyor for moving said articles along a front-to-back direction to feed and draw out the articles;

a pusher which is moved in accordance with movement of said conveyor to push said articles placed on said conveyor toward said front when said articles are fed from a place on said conveyor to said aligned positions and said information reader;

a driving source for driving said conveyor; and a grip device linked with said conveyor to be frontwardly and rearwardly moved with frontward and rearward movement of said conveyor for gripping said articles to draw out the same when said articles are drawn out from said aligned positions thereof and information reader onto said conveyor.

10. A carrier apparatus for taking information-storage regular articles in and out in accordance with claim 9, wherein:
   said picker further comprises a transfer base fixed to said conveyor, on which said pusher is mounted; and
   a stopper for limiting movement of said grip device, said grip device being arranged on said transfer base and frontwardly urged to be relatively movable in said front and rear direction with respect to said transfer base, advancing movement of said grip device being prevented by said stopper so that only said transfer base is advancingly driven, whereby said pusher projects over a grasping portion of said grip device.

11. A carrier apparatus for taking information-storage regular articles in and out in accordance with claim 10, wherein:
   said pusher is arranged on said transfer base movably along said front-to-back direction in frontwardly urged manner.

* * * * *